(12) United States Patent
Talneau et al.

(10) Patent No.: US 7,242,837 B2
(45) Date of Patent: Jul. 10, 2007

(54) PHOTONIC CRYSTAL STRUCTURE FOR MODE CONVERSION

(75) Inventors: Anne Juliette Talneau, Palaiseau (FR); Philippe Lalanne, Palaiseau (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 10/494,366

(22) PCT Filed: Nov. 21, 2002

(86) PCT No.: PCT/FR02/03993

§ 371 (c)(1),
(2), (4) Date: May 12, 2004

(87) PCT Pub. No.: WO03/044579

PCT Pub. Date: May 30, 2003

(65) Prior Publication Data

US 2005/0152656 A1 Jul. 14, 2005

(30) Foreign Application Priority Data

Nov. 21, 2001 (FR) .................................. 01 15057

(51) Int. Cl.
*G02B 6/10* (2006.01)
*G02B 6/26* (2006.01)
*G02B 6/42* (2006.01)

(52) U.S. Cl. .................. 385/129; 385/130; 385/131; 385/132; 385/15; 385/39; 385/43

(58) Field of Classification Search ................ 385/4–5, 385/14–15, 27–28, 31, 33–34, 39, 43, 50, 385/129–132
See application file for complete search history.

(56) References Cited

U.S. PATENT DOCUMENTS 6,064,506 A * 5/2000 Koops ........................ 359/237

(Continued)

FOREIGN PATENT DOCUMENTS

WO      98/53351      11/1998

OTHER PUBLICATIONS

Palamaru et al ("High reflectivity and low losses photonic crystals waveguides obtained by adiabatic modal conversion", Proc. SPIE Int. Soc. Opt. Eng., vol. 4438, 210 (2001).*

(Continued)

*Primary Examiner*—Frank G. Font
*Assistant Examiner*—Ryan Lepisto
(74) *Attorney, Agent, or Firm*—Oblon, Spivak, McClelland, Maier & Neustadt, P.C.

(57) ABSTRACT

A photonic crystal guided propagation structure. The structure includes a guide portion Wn, n being a positive real number or zero number, having a first configuration of rows of patterns, and a guide portion Wm, m being a real number, m>n, having a second configuration of rows of patterns, and a transition zone of distance D located between guide portion Wn and guide portion Wm, in which patterns aligned with at least one row of patterns in the first configuration decrease in size over distance D to allow progressive passing from the first configuration of rows of patterns to the second configuration of rows of patterns. The structures can be applied to the area of integrated optics (semiconductor lasers, laser modulators, filters, multiplexors, etc.).

16 Claims, 10 Drawing Sheets

U.S. PATENT DOCUMENTS

| | | | |
|---|---|---|---|
| 6,198,860 B1* | 3/2001 | Johnson et al. | 385/28 |
| 6,466,709 B1* | 10/2002 | Scherer et al. | 385/15 |
| 6,542,654 B1* | 4/2003 | Miller et al. | 385/16 |
| 6,542,682 B2* | 4/2003 | Cotteverte et al. | 385/125 |
| 6,560,006 B2* | 5/2003 | Sigalas et al. | 359/321 |
| 6,574,383 B1* | 6/2003 | Erchak et al. | 385/15 |
| 6,640,034 B1* | 10/2003 | Charlton et al. | 385/122 |
| 6,643,439 B2* | 11/2003 | Notomi et al. | 385/125 |
| 6,674,949 B2* | 1/2004 | Allan et al. | 385/129 |
| 6,683,898 B2* | 1/2004 | Østergaard et al. | 372/43 |
| 6,710,912 B1* | 3/2004 | Filkins et al. | 359/326 |
| 6,728,457 B2* | 4/2004 | Sigalas et al. | 385/125 |
| 6,778,746 B2* | 8/2004 | Charlton et al. | 385/122 |
| 6,832,029 B2* | 12/2004 | Roberson | 385/43 |
| 6,853,791 B2* | 2/2005 | Sigalas | 385/129 |
| 6,873,777 B2* | 3/2005 | Bourelle | 385/129 |
| 6,879,766 B2* | 4/2005 | Tomaru | 385/129 |
| 6,888,994 B2* | 5/2005 | Baumberg et al. | 385/129 |
| 2002/0191905 A1* | 12/2002 | Prather et al. | 385/24 |
| 2003/0030870 A1* | 2/2003 | Joannopoulos et al. | 359/161 |
| 2003/0068152 A1* | 4/2003 | Gunn | 385/129 |
| 2004/0109644 A1* | 6/2004 | Assefa et al. | 385/39 |

OTHER PUBLICATIONS

Talneau et al ("Quantitative measurement of low propagation losses at 1.55 mm on planar photonic waveguide", Optics Letters, vol. 26, No. 16, Aug. 15, 2001, pp. 1259-1261).*

Talneau et al ("Low-reflection photonic-crystal taper for efficient coupling between guide sections of arbitrary widths", Optics Letters, vol. 27, No. 17, Sep. 1, 2002, pp. 1522-1524).*

Talneau et al ("High-bandwidth transmission of an efficient photonic-crystal mode converter", Optics Letters, vol. 29, No. 15, Aug. 1, 2004, pp. 1745-1747).*

Yamada et al ("SOI-based Photonic Crystal Line-Defect Waveguides", Proceedings of SPIE, vol. 4870, 2002, pp. 283-297.*

Palamaru et al ("High reflectivity and low losses photonic crystals waveguides obtained by adiabatic modal conversion", Proc. SPIE Int. Soc. Opt. Eng., vol. 4438, 210 (2001).*

M. Palamaru, et al., "Photonic crystal waveguides: out-of-plane losses and adiabatic modal conversion", Applied Physics Letters, vol. 78, No. 11, pp. 1466-1468 Mar. 12, 2001.

Thomas D. Happ, et al., "Photonic crystal tapers for ultracompact mode conversion", Optics Letters, vol. 26, No. 14, pp. 1102-1104 Jul. 15, 2001.

Yong Xu, et al., "Adiabatic coupling between conventional dielectric waveguides and waveguides with discrete translational symmetry", Optics Letters, vol. 25, No. 10, pp. 755-757 May 15, 2000.

Kurt De Mesel, et al.,"Spot size converters for low cost PICs", ECIO'99, ThC2, pp. 253-258.

Attila Mekis, et al., "Tapered couplers for efficient interfacing between dielectric and photonic crystal waveguides", Journal of Lightwave Technology, vol. 19, No. 6, pp. 861-864 2001.

S. Yamada, et al., "Observation of light propagation in two-dimensional photonic crystal-based bent optical waveguides", Journal of Applied Physics, vol. 89, No. 2, pp. 855-858 Jan. 15, 2001.

* cited by examiner

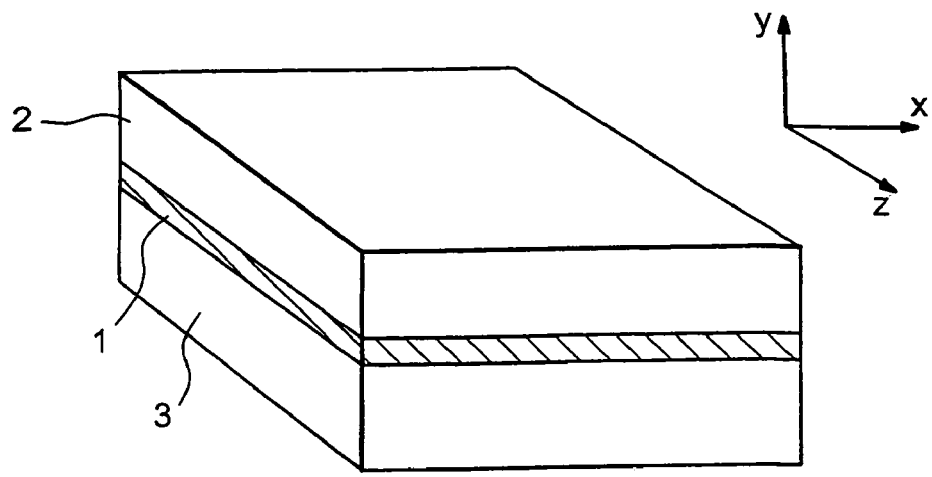
FIG. 1 KNOWN ART
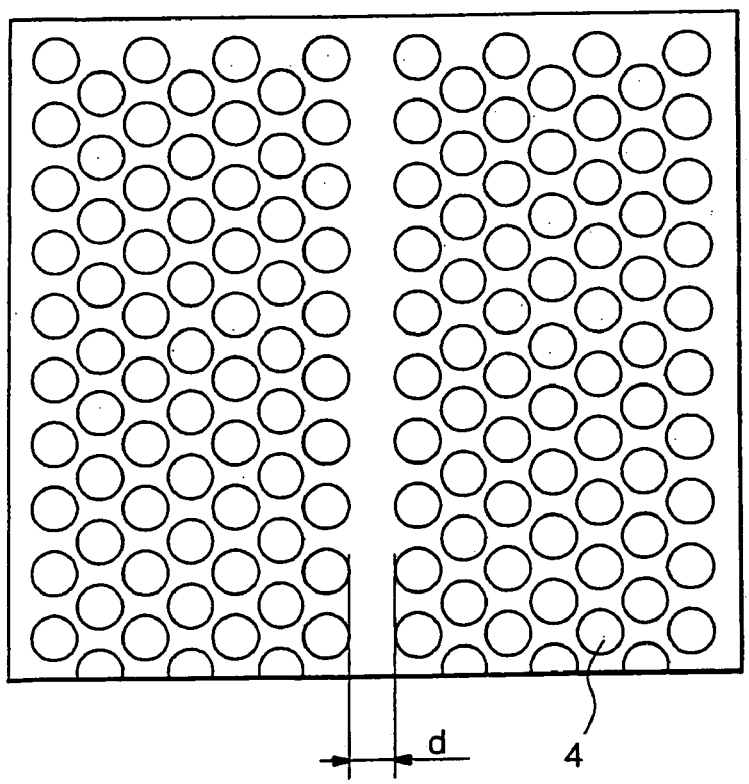
FIG. 2 KNOWN ART

KNOWN ART

KNOWN ART

KNOWN ART

PHOTONIC CRYSTAL STRUCTURE FOR MODE CONVERSION

CROSS REFERENCE TO RELATED APPLICATIONS

This application is filed under 35 U.S.C. §371 for PCT/FR02/03993, filed Nov. 21, 2002, and is based upon and claims priority under 35 U.S.C. §119 from French Patent Application No. 0115057, filed Nov. 21, 2001.

BACKGROUND OF THE INVENTION

The present invention concerns a photonic crystal structure for mode conversion.

The invention applies to the area of integrated optics.

In known art, the function of a mode converter or transformer is to convert a first optic mode which propagates in a first guided propagation structure into a second optic mode able to propagate in a second guided propagation structure. The two guided propagation structures may either form part of one same photonic integrated circuit, or form part of two separate circuits. A guided propagation structure may, for example, be an optic fibre.

FIG. 1 shows a guided propagation structure with vertical confinement of known art. Light propagates in direction z. In vertical direction y, the light is confined in a layer 1 of material of high index n1 sandwiched between two layers of material 2, 3 of lower index n2 and n3, respectively. In lateral direction x, the light is confined in the medium of index n1 either by a material charge (charged strip) or by another material (etched strip), this other material possibly being air. The materials of indices n1, n2, n3 may be semiconductor, dielectric or metallic materials. The size and shape of the propagation mode or modes borne by the structure in FIG. 1 are dependent upon the geometry of the structure and the value of indices n1, n2, n3.

Another propagation structure is shown in FIG. 2. FIG. 2 is an overhead view of a photonic crystal propagation structure.

The photonic crystal structure consists of a set of aligned patterns 4. Patterns 4 may for example be holes etched in a material, or pillars grouped side by side. In a one-dimensional application, the patterns may be parallel grooves etched in the material.

Different types of propagation guides may be made in a photonic crystal structure. A first type of guide consists of a photonic crystal structure in which n rows of neighbouring patterns are missing. In the remainder of the description, this first type of guide shall be called "Wn guide". By way of a non-restrictive example, FIG. 2 shows a structure in which a single row of patterns is missing. The guide is then a W1 guide. Wave propagation is based on the zone devoid of patterns (zone of width d in FIG. 2). Other types of guide are also known such as, for example, photonic crystal structures in which the zone devoid of rows of patterns does not correspond to the absence of an integer number of rows but to the absence of a non-integer number of rows (Wn guides with n real number), or photonic crystal structures in which patterns of different shape and/or size are made, for example holes of different sizes.

A guided propagation structure is optimised to best ensure a given function. It is the geometry of the structure which determines the propagation mode or modes. Mode conversion is very often necessary to pass from a first propagation structure ensuring a first function to a second propagation structure ensuring another function. Ideally; mode conversion makes it is possible to couple almost all the light getting out of the first structure into the second structure, to render negligible both reflection and losses through wave diffusion at the interface between the structures, and to ease alignment tolerances between the functions quite considerably, said alignment often accounting for high fabrication costs.

Examples of mode converters of known art are shown in FIGS. 3, 4 and 5.

The mode converter shown in FIG. 3 is disclosed in the document titled "*Spot Size Converter for Low Cost PICs*" (K. D. Mesel, I. Moerman, R. Baets, B. Dhoedt, P. Vandaela and J. Stulemeijer, ECIO'92, ThC2).

The converter in FIG. 3 is a converter of lateral type. A medium 5 of index n1 is sandwiched between two media 6 and 7 of respective indices n2 and n3. Mode conversion is achieved by the continuous widening of medium 5 along the direction of wave propagation. Widening of the propagation medium making it possible to pass from a first to a second propagation mode has to be made over a sufficiently long distance to achieve good performance. As an example, distance 1 over which widening is made may lie between 100 μm to 200 μm. The range of the wavelengths concerned is then the near-infrared (wavelengths of between 0.8 μm and 2 μm).

A second example of mode converter of known art is shown in FIG. 4. This second example of converter is disclosed in the document titled "*Tapered Couplers for Efficient Interfacing Between Dielectric and Phototonic Crystal Waveguides*" (Attila Mekis and J. D. Joannopoulos; Journal of Lightwave Technology, vol. 19, N° 6, June 2001).

The converter in FIG. 4 makes it possible to pass from a propagation mode in a dielectric guide of strip type to a propagation mode in a photonic crystal guide. The strip guide of width W enters the photonic crystal structure over a distance "a" and then tapers to a point over a distance "b".

A third example of mode converter of known art is shown in FIG. 5. This third example of converter is disclosed in the document titled "*Observation of light propagation in two-dimensional photonic crystal-based bent optical waveguides*" (S. Yamada et al.; Journal of Applied Physics, vol. 89, N° 2, 15 Jan. 2001).

The converter in FIG. 5 allows transition between a two-dimensional waveguide and a photonic crystal guide. Here transition is assured by the funnel shape of the region devoid of patterning in the photonic crystal guide. Good matching is only possible if the funnel-shaped region is sufficiently long.

As a general rule, it appears that the mode converters of known art need to be fabricated over sufficiently long lengths in the direction of wave propagation in order to be able to operate properly. These long distances have disadvantages. They are detrimental for example for circuit fabrication, in particular circuits which have to reach good dynamic performance levels. For example, to modulate a laser directly at 10 Gb/s it is preferable that its length should not be more than 100 μm. It is therefore not possible to equip such laser with a mode converter of known art. Also a non-negligible quantity of material is needed to fabricate these converters, which leads to a substantial increase in size and hence the costs of components.

The invention does not have the aforesaid disadvantages.

SUMMARY OF THE INVENTION

The invention concerns a photonic crystal guided propagation structure comprising a guide portion Wn, n being a positive real number or zero number, having a first configuration of rows of patterns. The structure also comprises:

a guide portion Wm, m being a real number, m>n, having a second configuration of rows of patterns, and a transition zone of distance D located between guide portion Wn and guide portion Wm, in which patterns aligned with at least one row of patterns of the first configuration diminish in size over distance D to allow gradual passing from the first configuration of rows of patterns to the second configuration of rows of patterns.

The invention also concerns a transition between a strip guide and photonic crystal guide. The transition comprises a photonic crystal guided propagation structure such as that of the invention mentioned above.

The invention also concerns a guided propagation structure comprising a first waveguide, a second waveguide and a mode converter between the first and second waveguide. The mode converter is a photonic crystal guided propagation structure such as that of the invention mentioned above.

The invention further concerns a photonic crystal cavity. The cavity successively comprises:

a guide portion Wi having a first configuration of rows of patterns, a first guide portion W0 forming a mirror and having a second configuration of rows of patterns, a guide portion Wj having a third configuration of rows of patterns, a second guide portion W0 forming a mirror and having a fourth configuration of rows of patterns identical to the second configuration, a guide portion Wk having a fifth configuration of rows of patterns, and a succession of transition zones, a transition zone being positioned between two successive guide portions so that the assembly formed by a transition zone and the two guide portions surrounding the transition zone form a photonic crystal guided propagation structure such as that of the invention mentioned above.

A mode converter of the invention therefore comprises at least one series of patterns of progressively varying size between two waveguides. Advantageously, this structure has a finished length D of small size (typically a few wavelengths). The progressive variation in size of the patterns enables progressive passing between the two waveguides. This progressive passing operates a mode conversion (progressive conversion from a propagation mode which propagates in the first guide into a propagation mode propagating in the second guide).

The invention is based on the physical principle according to which when an electromagnetic wave of slightly greater wavelength than the characteristic size of a structure interacts with this structure, this wave does not diffract in the usual meaning of the term. Everything takes place as if the wave propagates in a continuous material, commonly called artificial material, whose index depends firstly on the quantity of etched material. The electromagnetic wave does not see the detail of the etched patterns forming the structure. It is therefore only sensitive to a local average.

The propagation structure of the invention advantageously makes it possible to achieve short optic transitions with very low losses.

BRIEF DESCRIPTION OF THE FIGURES

Other characteristics and advantages of the invention will become apparent on reading a preferred embodiment of the invention described with reference to the appended figures among which:

FIG. 1 shows a first guided propagation structure of known art,

FIG. 2 shows a second guided propagation structure of known art,

In all the figures, the same references designate the same parts.

In the remainder of the description, most of the guided propagation structures of the invention are mode converters which allow the passing from a Wn guide to a Wm guide, n≠m, n and m being integers. The invention also concerns photonic crystal structures with which it is possible to pass from any first guide to any second guide. The first and second guides can then not only be Wn guides, n integer, but also for example photonic crystal structures in which the zone with missing rows of patterns corresponds to a non-integer number of rows (Wn guides with n real number), or photonic crystal structures in which it is the size of the holes and not their absence which creates the guide zone, or even strip guides.

DETAILED DESCRIPTION OF THE INVENTION

FIGS. 1, 2, 3, 4 and 5 have been previously described and do not require further description.

Figure 3:
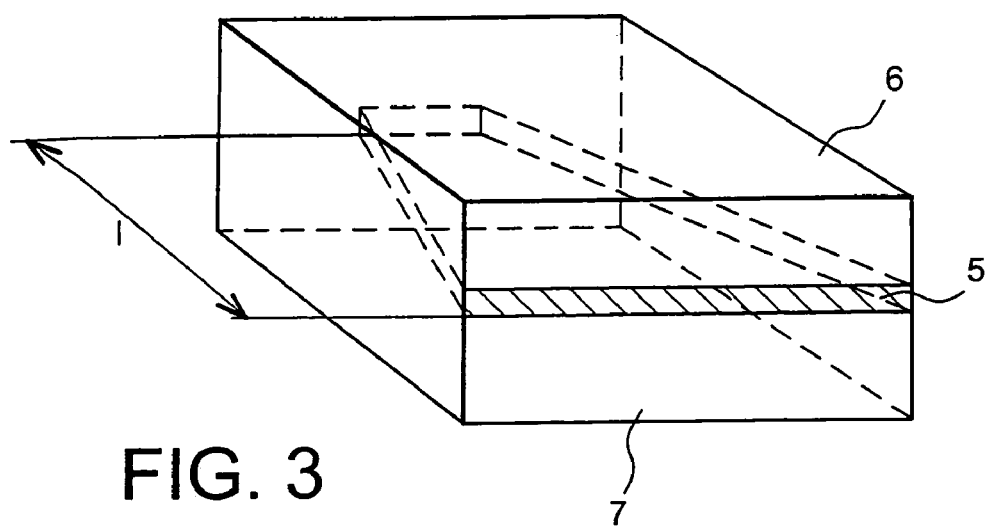
FIG. 3 shows a first example of mode converter of known art.
Figure 4:
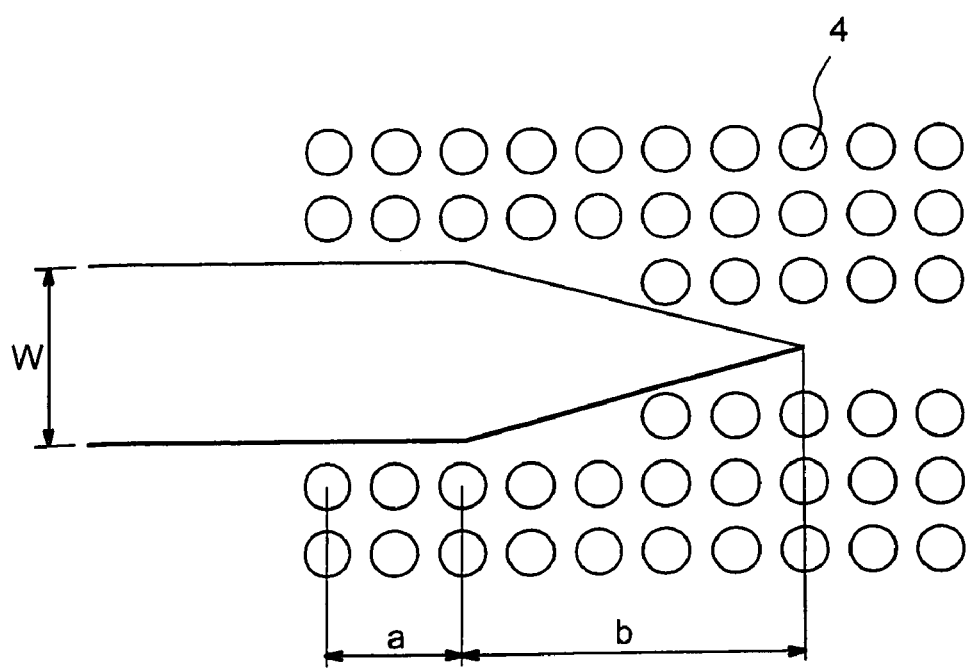
FIG. 4 shows a second example of mode converter of known art.
Figure 5:
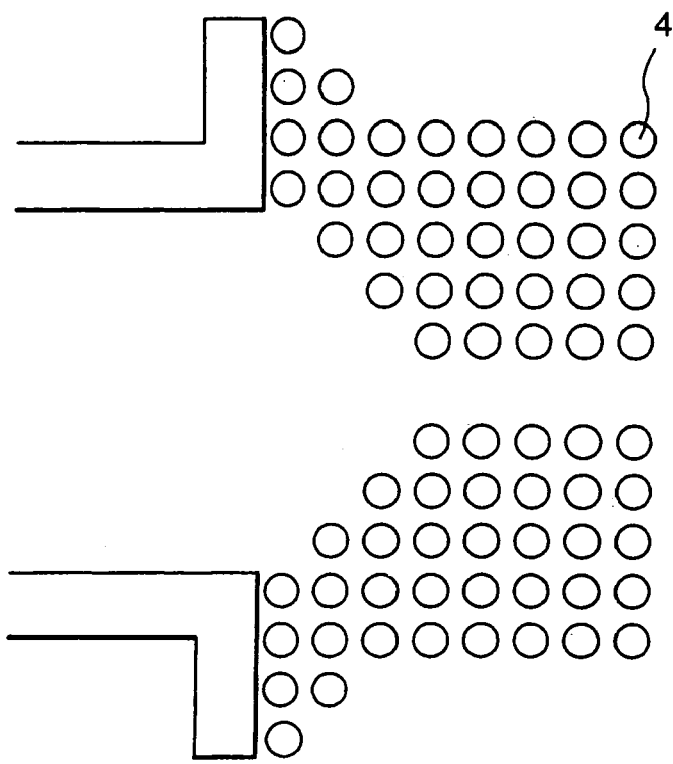
FIG. 5 shows a third example of mode converter of known art.
Figure 6:
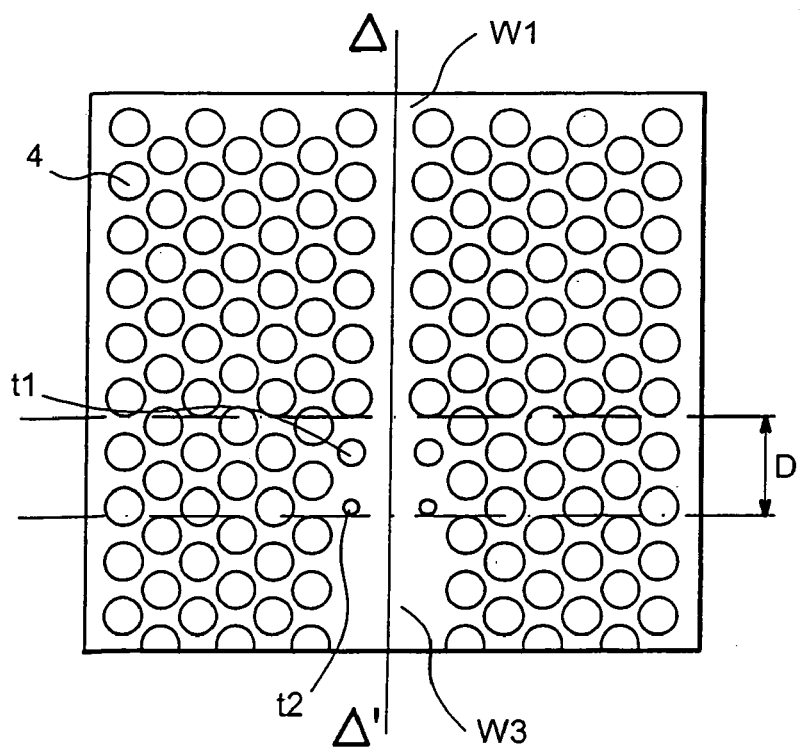
FIG. 6 shows a first example of mode converter according to the invention.

FIG. 6 is an overhead view of a first example of mode converter according to the invention. The mode converter is made in a photonic crystal structure consisting of a set of patterns 4. Patterns 4 are, for example, air holes obtained by etching a semiconductor material. The vertical confinement of the propagating wave is ensured by a layer of high index (GaInAsP) the thickness of which is, for example, 500 nm, positioned between two layers of material with a lower index (InP). The air-holes are positioned in the direction of wave propagation and for example define a triangular lattice whose mesh size is 450 nm. The diameter of the holes may be 300 nm for example with a depth of 1 µm. Isotropic etching, for example plasma dry etching, is used to make the holes. The converter operates the conversion of a W1 guide mode into a W3 guide mode and reciprocally.

Guide part W1 is characterized by a row of missing holes in the photonic crystal structure, and guide part W3 is characterized by three rows of missing holes in this same structure. Guide parts W1 and W3 are naturally aligned along one same axis ΔΔ'. The transition from guide part W1 to guide part W3 is made by interrupting, with diameter decrease, the holes of the two rows which define guide part W1. As shown in FIG. 6, two holes t1, t2 may be sufficient to ensure transition over one row. By way of non-restrictive example, for a hole diameter in the photonic crystal structure of 300 nm as aforesaid, holes t1 and t2 have respective diameters of 200 nm and 100 nm. Advantageously, distance D over which the diameter of the holes decreases is relatively short. In the above example distance D equals approximately 700 nm for example. The holes of smaller diameters may or may not be etched less deep than the holes of greater diameters.

Preferably, the holes are fabricated on a regular grid which is the grid of the photonic crystal. It is then during the electronic lithography step defining the photonic crystal that the hole diameters are adjusted. It is to be noted however that the use of the regular grid of the photonic crystal to fabricate the artificial material is only for convenience purposes. The holes may also be positioned at different locations, their size and depth then being adjusted accordingly. Hole positioning may not, in this case, be periodic.

According to the above-described embodiment of the invention, the patterns which define the photonic crystal structure are air holes. The invention also concerns the case when the patterns are made in a material of index different from 1 added to holes formed in the crystal, for example the case when liquid crystal fills the holes. The patterns may also be made by pillars. These pillars may for example be of square or rectangular section but any other form of section is also possible.

Figure 7:
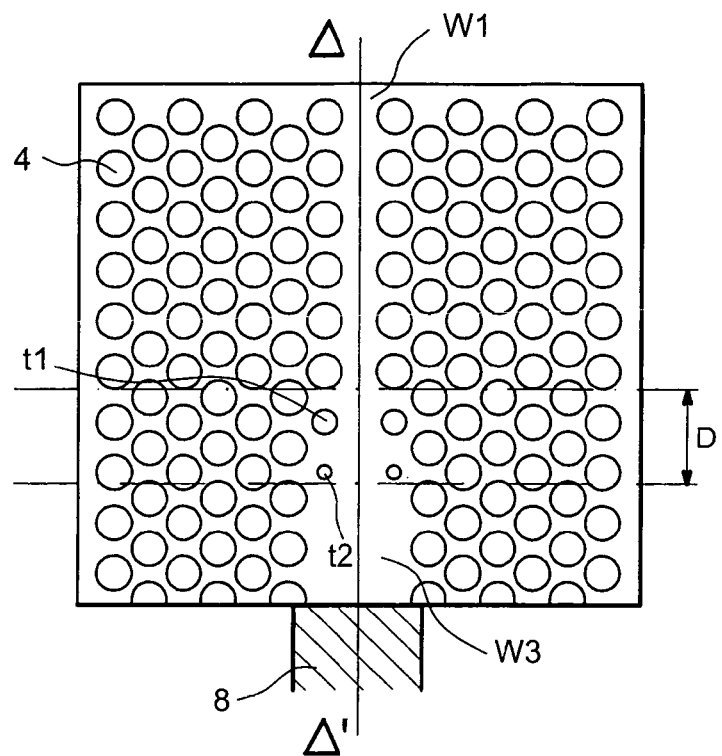
FIG. 7 shows a first application of a mode converter according to the invention, FIGS. 8A and 8B, by way of example, show circuit principles to illustrate the performance levels of a mode converter according to the invention.

FIG. 7 shows a first application of a mode converter according to the first example of the invention. The device shown in FIG. 7 is a transition between a strip guide 8 and a photonic crystal guide.

It is known to persons skilled in the art that guide W1 is an advantageous guide for guiding an optic wave into a photonic crystal structure. As will be shown below, with the invention it is possible to achieve coupling simply and with excellent performance levels between a strip guide and a W1 photonic crystal guide.

The direct transition between a strip guide and a W3 photonic crystal guide is known to give good transmission performance. As described above, mode conversion using a W3/W1 photonic crystal converter of the invention also achieves good performance levels. It follows that the mode conversion of the invention between a strip guide and a W1 photonic crystal guide gives particularly advantageous results.

Figure 8A:
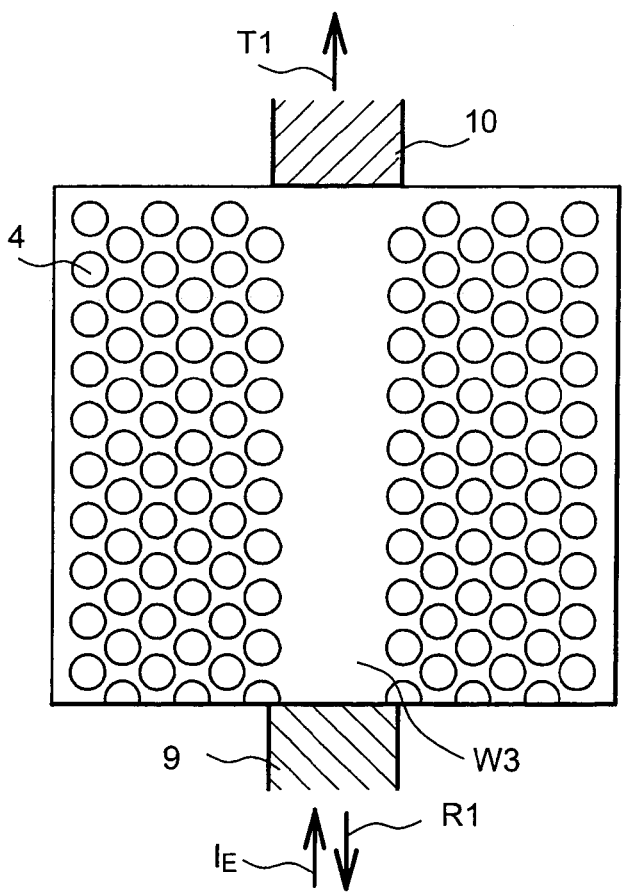
Figure 8B:
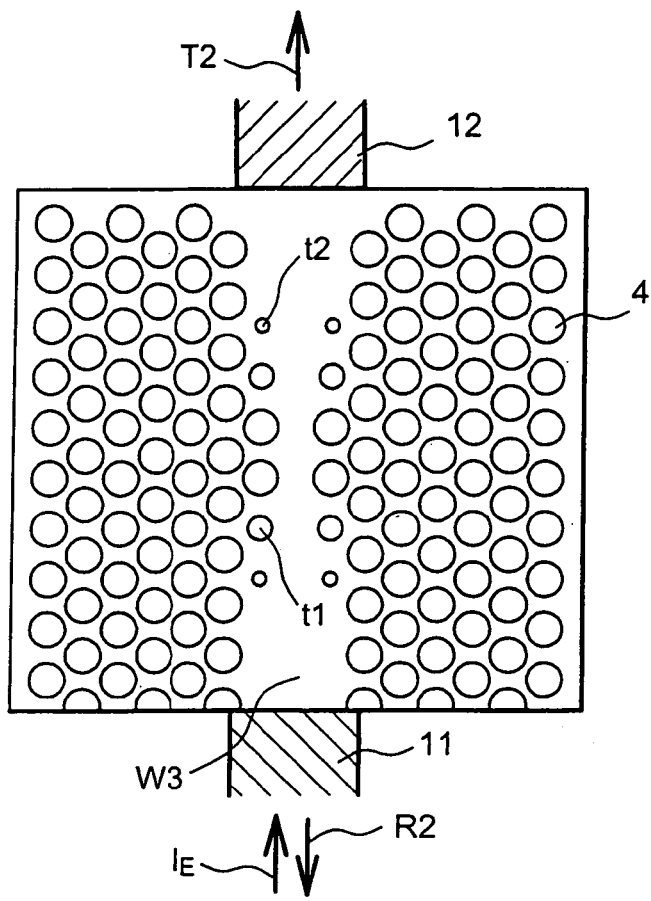

FIGS. 8A and 8B show, as examples, circuit principles to illustrate the performances of a mode converter of the invention.

FIG. 8A shows a reference structure which is not a structure of the invention and which is successively formed of a first strip guide 9, a W3 photonic crystal guide and a second strip guide 10.

FIG. 8B shows a structure of the invention which is successively formed of a first strip guide 11, a photonic crystal structure comprising in series a W3/W1 transition and a W1/W3 transition, and a second strip guide 12.

The width of strips 9, 10, 11, 12 is chosen to be 220×√2 nm for example. References Ti and Ri (i=1, 2) respectively represent the intensities transmitted and reflected in fundamental $TE_{00}$ mode of the strip guides. $I_E$ represents the intensity of the incident wave.

The photonic crystal is assumed to be etched in a planar guide consisting of a core of index 3.5, a substrate of index 3 and an upper layer of index 3.4, with a thickness of 330 nm. The holes 4 of the photonic crystal have a diameter of 130 nm, a depth of 900 nm and are arranged in a triangular lattice of period 220 nm. As shown in FIG. 8B, two holes t1 and t2, along one row, ensure W1/W3 transition or W3/W1 transition. Hole t1 has a diameter of 88 nm for example and hole t2 a diameter of 44 nm for example. A calculation was made with three-dimensional exact electromagnetic theory. Over the entire spectral interval corresponding to the forbidden band of the photonic crystal (i.e. 0.75 µm<λ<0.98 µm) mean values for T1, T2 and R1 of respectively 83%, 96% and 1% were obtained (the percentages are calculated here with reference to an incident intensity $I_E$ of 100%).

The circuit in FIG. 8B comprises two transitions. It follows that the mean coupling value of only one transition (√T2/T1) is 93%. This excellent value relative to the one obtained using a transition of the known art is advantageously obtained with very short coupling (typically 660 nm) and with a wide spectral range (Δλ/λ>25%).

Figure 9:
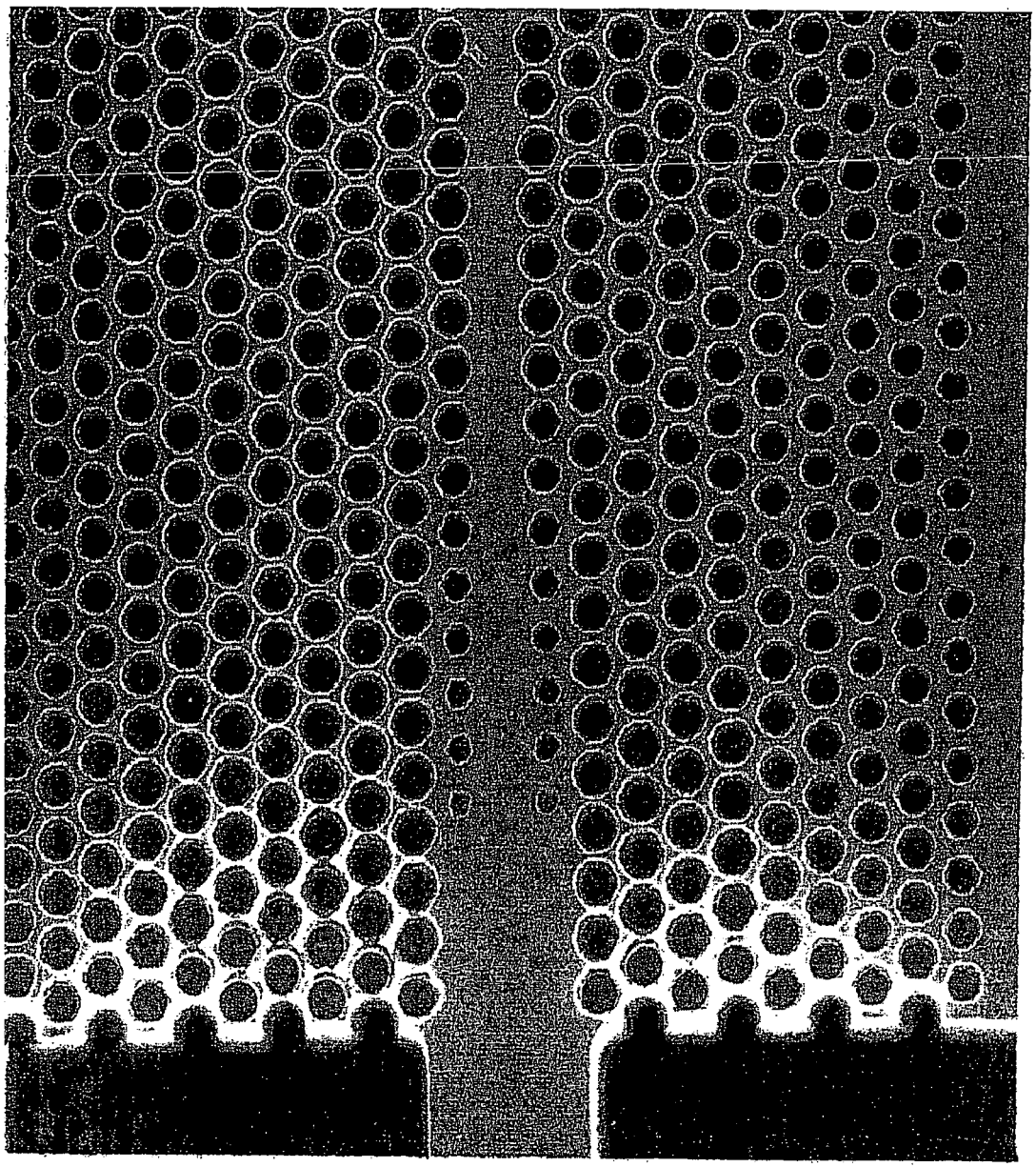
FIG. 9 is a photograph of a mode converter according to the invention.

FIG. 9 is a photograph of a W3/W1 mode converter (and reciprocally W1/W3) of the invention. The distance between two holes is typically 450 nm.

Measurements of power reflection made on this converter have led to very good results. The wavelengths used were between 1500 nm and 1590 nm, wavelengths for which the semiconductor material used is transparent. A reflection coefficient relating to the power was measured less than 1%. By way of comparison, the reflection coefficient of a W1/W3 transition devoid of gradual decrease in hole diameter (case in which the two rows of holes defining the W1 guide are suddenly broken) is substantially equal to 25%.

Figure 10:
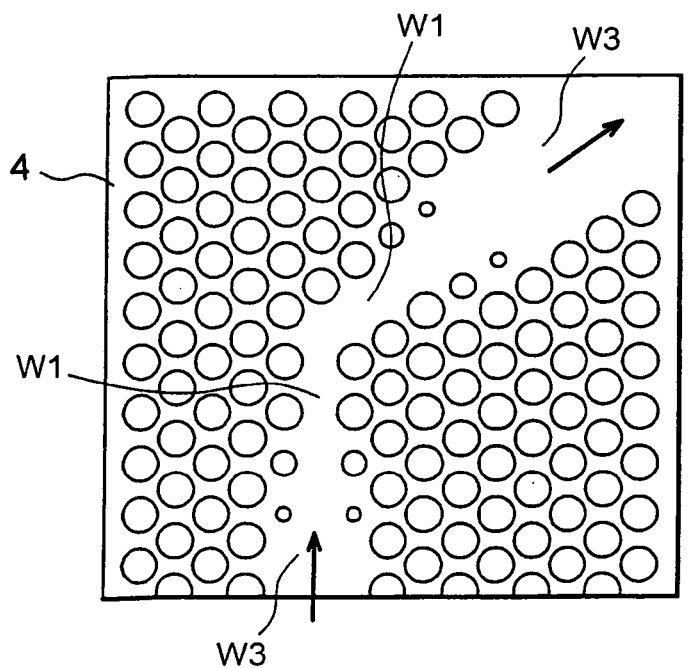
FIG. 10 shows a second application of mode converter according to the invention.

FIG. 10 shows a second application of a mode converter according to the first example of the invention.

The circuit shown in FIG. 10 is a bend made in a photonic crystal guide. As known to persons skilled in the art, any disturbance occurring along a propagation guide is a source of mis-matching and leads to partial reflection of the propagating wave. Transmission losses are a result thereof. From this viewpoint, a bend can be considered a disturbance. At equal curvature, it is known that a bend in a Wn guide shows less loss than a bend in a Wm guide, with n<m. The mode converter of the invention advantageously permits the design of structures in which the propagation guide is a Wm guide in its straight parts and a Wn guide (n<m) in bends.

By way of a non-restrictive example, FIG. 10 illustrates a photonic crystal guided structure in the form of a bend which comprises a W3/W1 transition, a bend in a W1 guide and a W1/W3 transition. Propagation performance levels are thereby very advantageously enhanced.

Figure 11:
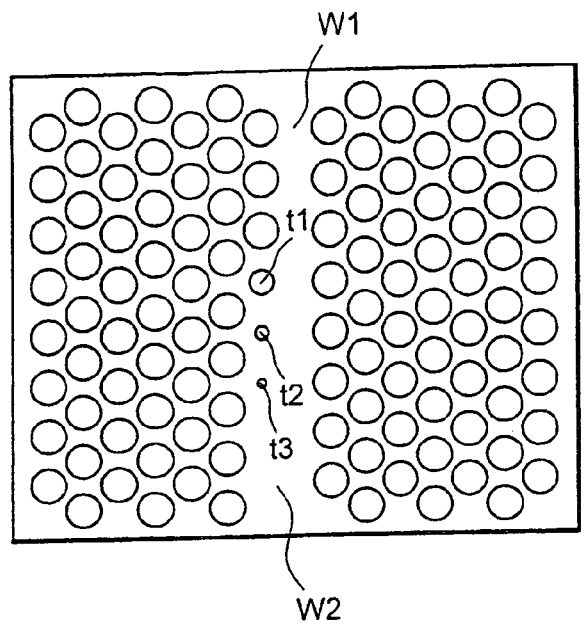
FIG. 11 shows a second example of mode converter according to the invention.

FIG. 11 shows a second example of mode converter according to the invention. The mode converter of the second example permits transition between a W1 guide and a W2 guide. Guide part W2 is characterized by two rows of missing holes in the crystal structure. Transition from guide part W1 to guide part W2 is made by interrupting, by decreasing diameter, the holes of one of the two rows which define guide part W1. As shown by way of a non-restrictive example in FIG. 9, three holes t1, t2, t3 may suffice to achieve the transition. For a hole diameter in the photonic crystal structure of 300 nm, the three holes t1, t2, t3 may have respective diameters of 200 nm, 100 nm, 50 nm. According to this second example of mode converter, guide parts W1 and W2 are not aligned along the same axis. It was found that this misalignment is not detrimental to transition performance.

Figure 12:
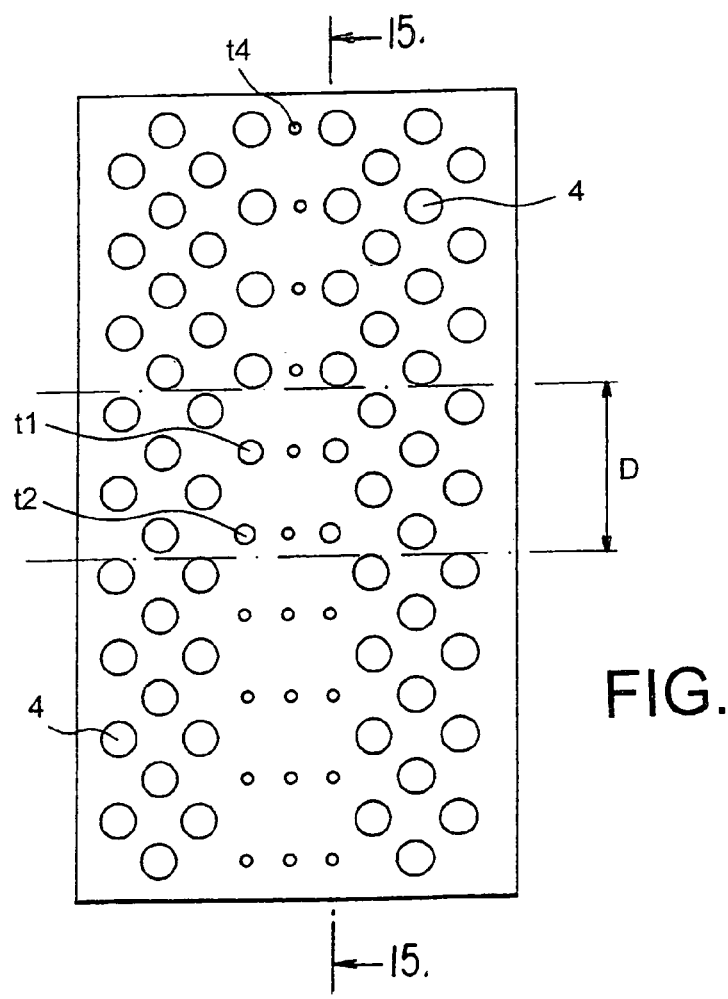
FIG. 12 shows a third example of mode converter according to the invention.

FIG. 12 shows a third example of mode converter according to the invention. According to this third example, the mode converter operates the transition between a photonic crystal guide of W1 type and a photonic crystal guide of W3 type. By photonic crystal guide of W1 type is meant a W1 guide such as defined above in which the central part, instead of being devoid of holes, is provided with a row of holes t4 of small size relative to the main holes 4 of the structure. Similarly, by photonic crystal guide of W3 type is meant a W3 guide such as defined above in which the central part, instead of being devoid of holes, is provided with three rows of holes of smaller size than the main holes 4, for example holes t4.

Figure 15:
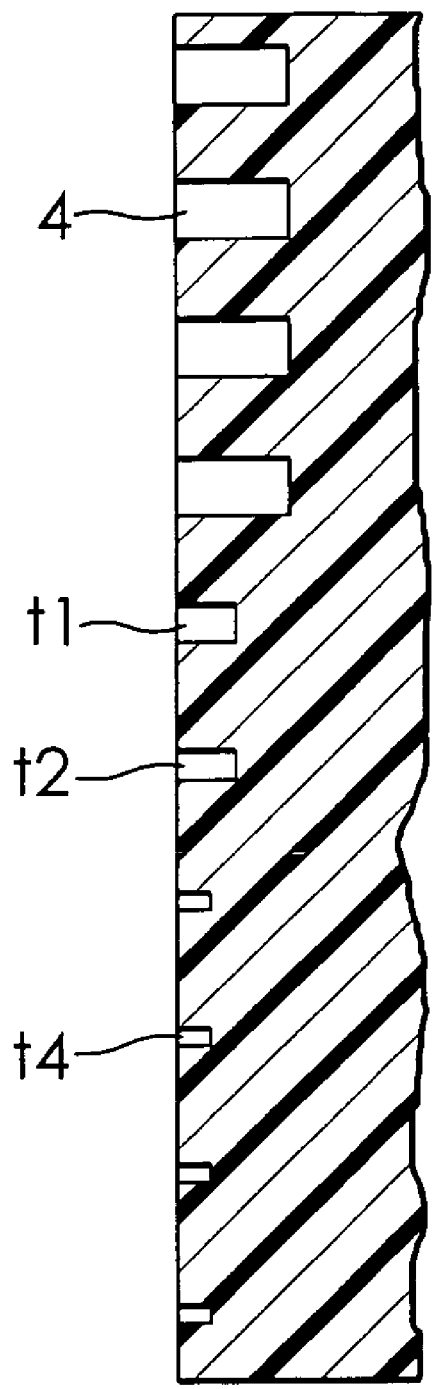
FIG. 15 shows a cross section of the third example shown in FIG. 12 taken along the line 15—15.

The transition between a guide of type W1 and a guide of type W3 is made by holes with diminishing diameter. Two holes t1 and t2 may then be sufficient to ensure the transition between a row of holes 4 in the guide of type W1 and a row of holes t4 in the guide of type W3. A number of holes greater than two may also ensure the transition. FIG. 15 shows an embodiment where the depth of holes 4 is greater then the depth of holes t1 and t2. Further, the depth of holes t1 and t2 is greater than the depth of holes t4.

Figure 13:
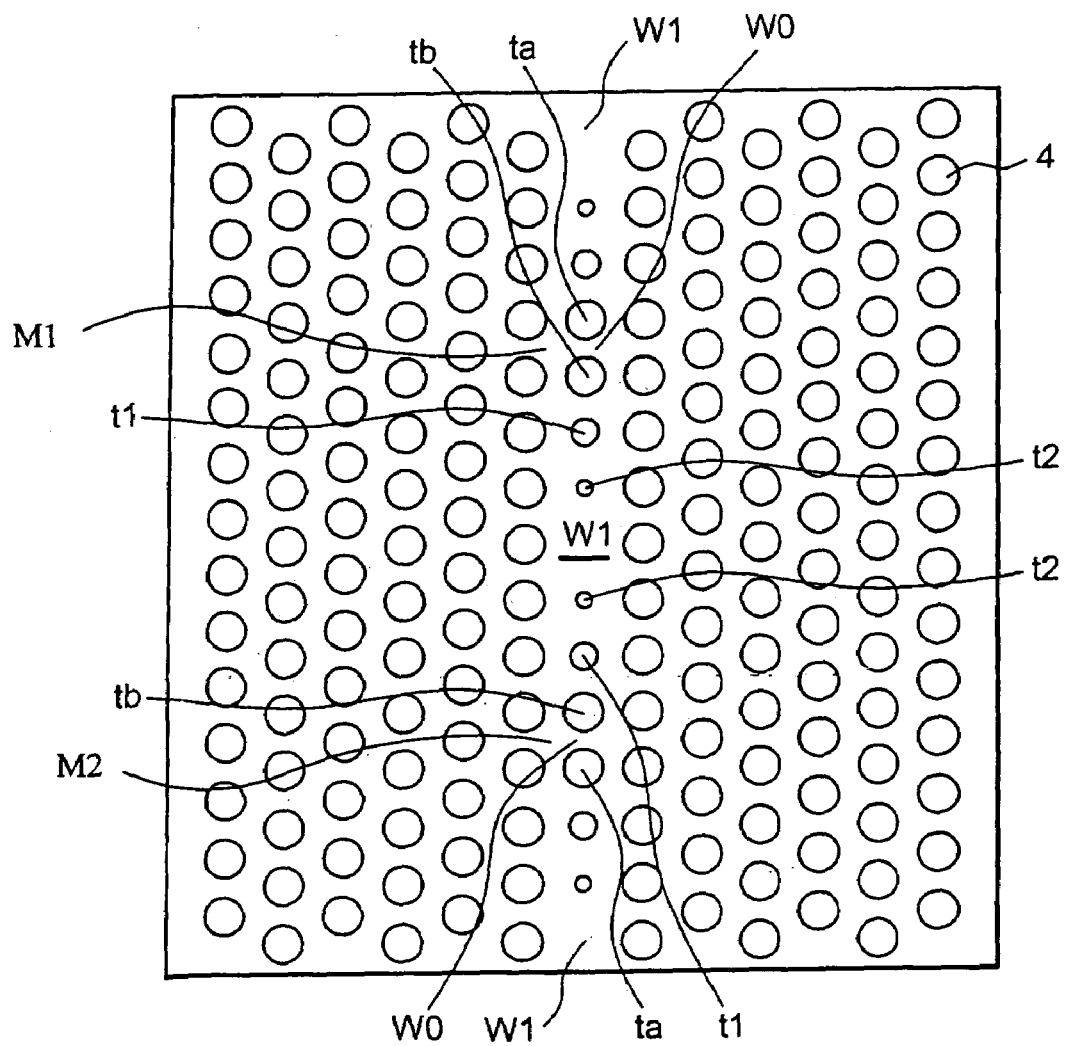
FIG. 13 shows a first example of a photonic crystal cavity according to the invention.

FIG. 13 shows a first example of a photonic crystal cavity made using mode converters of the invention. The cavity is defined by two mirrors M1 and M2. Each of the two mirrors is, for example, made by two holes ta, tb. Each mirror may be identified with a Wn guide for which n=0 (no missing row of patterns). The photonic crystal cavity may therefore be considered as being formed of five successive guide portions W1, W0, W1, W0 and W1, a transition zone consisting for example of two holes t1 and t2 with varying diameter being positioned between two successive guide portions. An assembly made up of a transition zone and the two guide portions surrounding this zone form a photonic crystal guided propagation structure according to the invention.

The cavity obtained advantageously has a higher quality factor and smaller losses than a cavity devoid of mode converters according to the invention.

Figure 14:
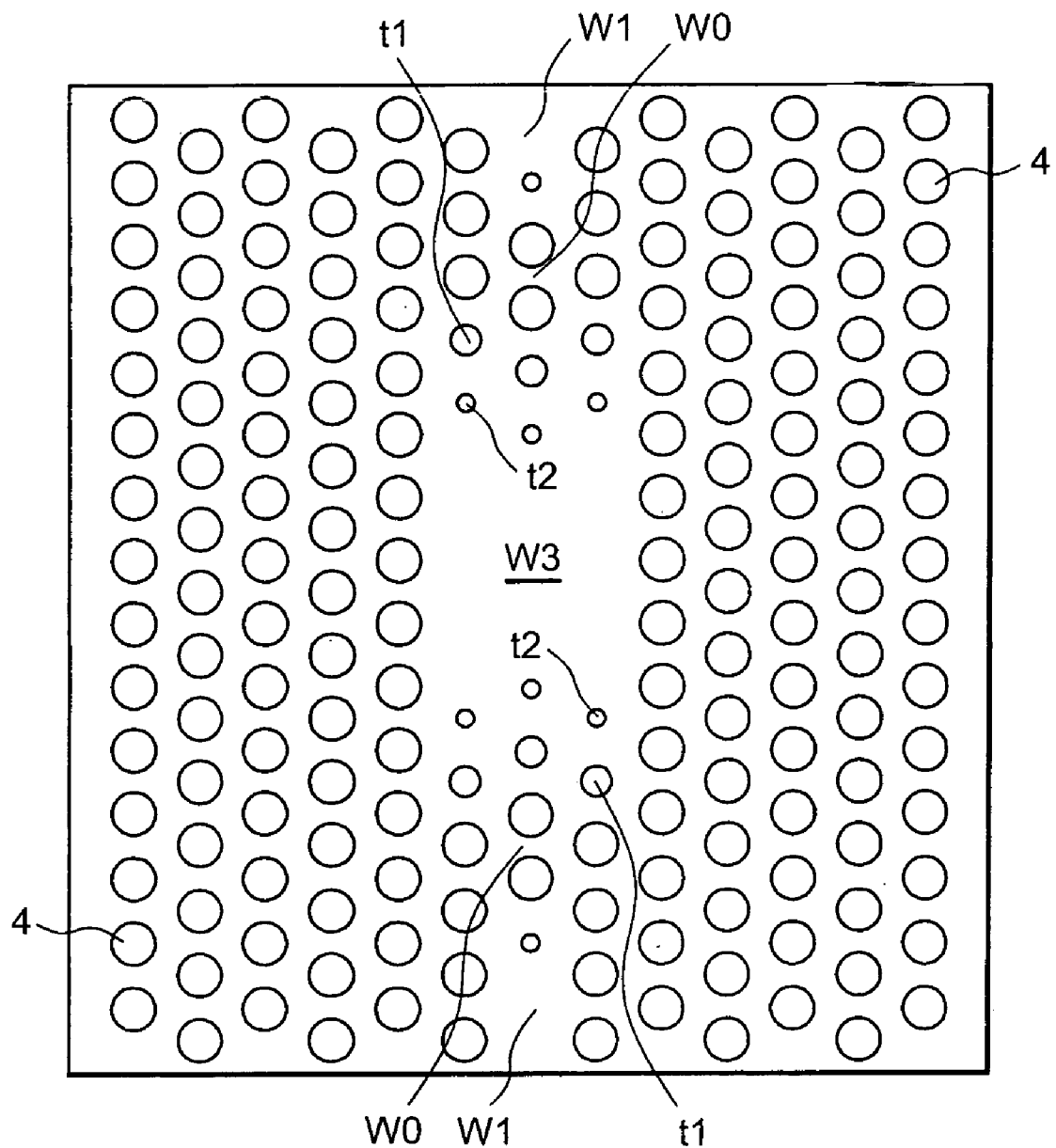
FIG. 14 shows a second example of a photonic crystal cavity according to the invention.

FIG. 14 shows a second example of a photonic crystal cavity according to the invention. The five successive guide portions participating in the cavity here are guide portions W1, W0, W3, W0 and W1. Guide portions W0 each form a mirror. An assembly made up of a transition zone and the two guide portions surrounding this zone also form a photonic crystal guided propagation structure according to the invention.

More generally, the five successive guide portions participating in the cavity are guide portions W1, W0, Wj, W0 and Wk, i, j and k being positive real numbers.

The mode converters of the invention are advantageously compatible with propagation guides based on the principle of total internal reflection (case when light propagating in a high index medium and arriving at a medium of lower index is trapped by total reflection on account of index contrast).

More generally the mode converters of the invention make it possible to pass from any guide with total internal reflection or with photonic crystal to any other guide with total internal reflection or with photonic crystal. It is therefore possible, for example, to optimise the coupling of a given structure with an optic fibre or to associate several structures of different waveguides in one same photonic integrated circuit, thereby allowing considerable miniaturisation of optic circuits and, hence, the possibility of integrating numerous optic functions within a very small volume.

The invention claimed is:

1. A photonic crystal guided propagation structure comprising:
   a guide portion Wn corresponding to a first configuration of rows of patterns where n is a positive real number or zero corresponding to a number of rows of neighboring patterns that are missing in the guide portion Wn;
   a guide portion Wm corresponding to a second configuration of rows of patterns where m is a positive real number greater than n corresponding to a number of rows of neighboring patterns that are missing in the guide portion Wm; and
   a transition zone of a predetermined distance located between guide portion Wn and guide portion Wm, in which patterns aligned with at least one row of patterns in the first configuration of rows of patterns decrease in size over the predetermined distance to allow progressive passing from the first configuration of rows of patterns to the second configuration of rows of patterns,
   wherein, the patterns are holes having a diameter of substantially 300 nm in the first and second guide portions, and
   a number of holes in the transition zone, which are aligned with a row of holes in the first guide portion and which decrease in size, is equal to two, said two holes having respective diameters of 200 nm and 100 nm.

2. A photonic crystal guided propagation structure according to claim 1, wherein the patterns define a periodic network.

3. A photonic crystal guided propagation structure comprising:
   a guide portion Wn corresponding to a first configuration of rows of patterns where n is a positive real number or zero corresponding to a number of rows of neighboring patterns that are missing in the guide portion Wn;
   a guide portion Wm corresponding to a second configuration of rows of patterns where m is a positive real number greater than n corresponding to a number of rows of neighboring patterns that are missing in the guide portion Wm; and
   a transition zone of a predetermined distance located between guide portion Wn and guide portion Wm, in which patterns aligned with at least one row of patterns in the first configuration of rows of patterns decrease in size over the predetermined distance to allow progressive passing from the first configuration of rows of patterns to the second configuration of rows of patterns,
   wherein, the patterns are holes having a diameter of substantially 300 nm in the first and second guide portions, and
   a length of the predetermined distance is substantially 700 nm.

4. A photonic crystal guided propagation structure according to claim 3, wherein the patterns define a periodic network.

5. A transition between a strip guide and a photonic crystal guide, comprising a guided propagation structure comprising:
   a guide portion Wn corresponding to a first configuration of rows of patterns where n is a positive real number or zero corresponding to a number of rows of neighboring patterns that are missing in the guide portion Wn;

a guide portion Wm corresponding to a second configuration of rows of patterns where m is a positive real number greater than n corresponding to a number of rows of neighboring patterns that are missing in the guide portion Wm; and a transition zone of a predetermined distance located between guide portion Wn and guide portion Wm, in which patterns aligned with at least one row of patterns in the first configuration of rows of patterns decrease in size over the predetermined distance to allow progressive passing from the first configuration of rows of patterns to the second configuration of rows of patterns, wherein the guided propagation structure is a structure in which n=1 and m=3.

6. A guided propagation structure comprising:

a first waveguide;

a second waveguide; and a mode converter between the first and second waveguides, wherein the mode converter is a guided propagation structure comprising, a guide portion Wn corresponding to a first configuration of rows of patterns where n is a positive real number or zero corresponding to a number of rows of neighboring patterns that are missing in the guide portion Wn;

a guide portion Wm corresponding to a second configuration of rows of patterns where m is a positive real number greater than n corresponding to a number of rows of neighboring patterns that are missing in the guide portion Wm; and a transition zone of a predetermined distance located between guide portion Wn and guide portion Wm, in which patterns aligned with at least one row of patterns in the first configuration of rows of patterns decrease in size over the predetermined distance to allow progressive passing from the first configuration of rows of patterns to the second configuration of rows of patterns, wherein the first waveguide is a photonic crystal guide and the second waveguide is a photonic crystal guide comprising a set of patterns forming a mirror.

7. A photonic crystal cavity, successively comprising:

a first guide portion Wi corresponding to a first configuration of rows of patterns where i is a positive real number or zero corresponding to a number of rows of neighboring patterns that are missing in the first guide portion;

a second guide portion W0 corresponding to a second configuration of rows of patterns where zero rows of neighboring patterns are missing in the second guide portion, guide portion W0 forming a mirror;

a third guide portion Wj corresponding to a third configuration of rows of patterns where j is a positive real number or zero corresponding to a number of rows of neighboring patterns that are missing in the third guide portion;

a fourth guide portion W0 corresponding to a fourth configuration of rows of patterns where zero rows of neighboring patterns are missing in the fourth guide portion, guide portion W0 forming a mirror and being identical to the second configuration;

a fifth guide portion Wk corresponding to a fifth configuration of rows of patterns where k is a positive real number or zero corresponding to a number of rows of neighboring patterns that are missing in the fifth guide portion; and a succession of transition zones, a transition zone being positioned between two successive guide portions so that an assembly formed by a transition zone and the two guide portions surrounding the transition zone form a photonic crystal guided propagation structure comprising, a guide portion Wn corresponding to a sixth configuration of rows of patterns where n is a positive real number or zero corresponding to a number of rows of neighboring patterns that are missing in the guide portion Wn;

a guide portion Wm corresponding to a seventh configuration of rows of patterns where m is a positive real number greater than n corresponding to a number of rows of neighboring patterns that are missing in the guide portion Wm; and a transition zone of a predetermined distance located between guide portion Wn and guide portion Wm, in which patterns aligned with at least one row of patterns in the first configuration of rows of patterns decrease in size over the predetermined distance to allow progressive passing from the first configuration of rows of patterns to the second configuration of rows of patterns.

8. A photonic crystal cavity according to claim 7, in which i=k.

9. A photonic crystal cavity according to claim 8, in which i=1 and j=1.

10. A photonic crystal cavity according to claim 8, wherein i=1 and j=3.

11. A photonic crystal guided propagation structure comprising:

a first guide portion Wn corresponding to a first configuration of rows of holes where n is a positive real number or zero corresponding to a number of rows of neighboring holes that are missing in the guide portion Wn;

a guide portion Wm corresponding to a second configuration of rows of holes where m is a positive real number greater than n corresponding to a number of rows of neighboring holes that are missing in the guide portion Wm; and a transition zone of distance D located between first guide portion Wn and second guide portion Wm, in which holes aligned with at least one row of holes in the first configuration decrease in size in three dimensions over distance D to allow progressive passing from the first configuration of rows of holes to the second configuration of rows of holes, the holes positioned in the transition zone being increasingly less deep from the first guide portion to the second guide portion, wherein the holes have a diameter of substantially 300 nm in the first and second guide portions.

12. A guided propagation structure according to claim 11, wherein the holes define a periodic network.

13. A guided propagation structure according to claim 11, wherein the number of holes of the transition zone, which are aligned with a row of holes in the first guide portion and which decrease in size, is equal to two, said two holes having respective diameters of 200 nm and 100 nm.

14. A guided propagation structure according to claim 11, wherein distance D is substantially 700 nm.

15. A guided propagation structure according to claim 11, wherein pieces of material with an index are added to holes formed in the photonic crystal guided propagation structure.

16. A photonic crystal guided propagation structure comprising:

a first guide portion Wn corresponding to a first configuration of rows of holes where n is a positive real number or zero corresponding to a number of rows of neighboring holes that are missing in the guide portion Wn:

a guide portion Wm corresponding to a second configuration of rows of holes where m is a positive real number greater than n corresponding to a number of rows of neighboring holes that are missing in the guide portion Wm; and a transition zone of distance D located between first guide portion Wn and second guide portion Wm, in which holes aligned with at least one row of holes in the first configuration decrease in size in three dimensions over distance D to allow progressive passing from the first configuration of rows of holes to the second configuration of rows of holes, the holes positioned in the transition zone being increasingly less deep from the first guide portion to the second guide portion.

wherein the holes define a periodic network, and the periodic network is a triangular lattice whose mesh size is substantially 450 nm.

* * * * *